No. 710,955. Patented Oct. 14, 1902.
J. W. CRAWFORD.
SCRAPER FOR PANS, KETTLES, &c.
(Application filed Dec. 26, 1901.)
(No Model.)
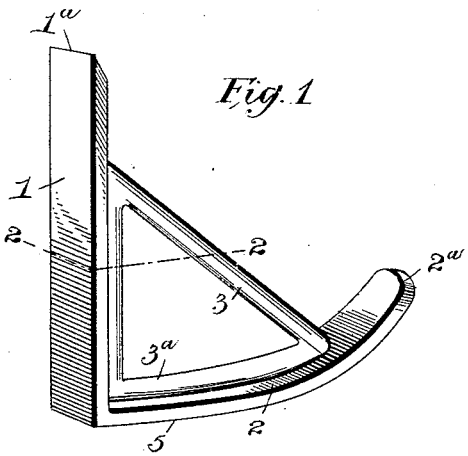
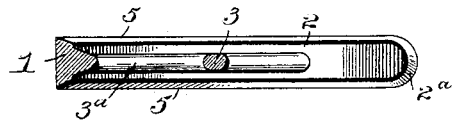
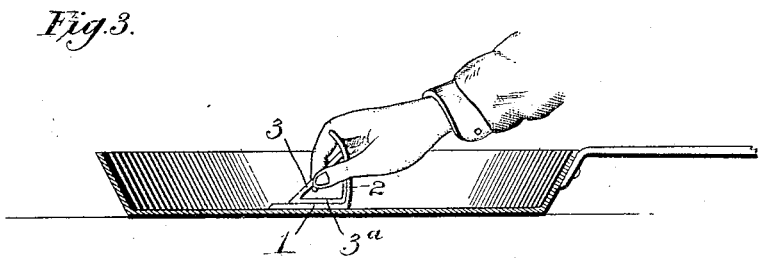
WITNESSES:
Geo. P. Kingsbury.
Amos W. Hart
INVENTOR
James W. Crawford.
BY Munn & Co.
ATTORNEYS

UNITED STATES PATENT OFFICE.

JAMES WILLIAM CRAWFORD, OF APPLETON, WISCONSIN.

SCRAPER FOR PANS, KETTLES, &c.

SPECIFICATION forming part of Letters Patent No. 710,955, dated October 14, 1902.

Application filed December 26, 1901. Serial No. 87,221. (No model.)

*To all whom it may concern:*

Be it known that I, JAMES WILLIAM CRAWFORD, a citizen of the United States, residing at Appleton, in the county of Outagamie and State of Wisconsin, have made certain new and useful Improvements in Scrapers for Pans, Kettles, &c., of which the following is a specification.

My invention is an improved device for scraping and cleaning pans, pots, kettles, kitchen utensils, &c.; and the same consists of a straight bar and a curved bar having beveled side edges and ends and provided with a handle which extends between the two bars and serves also as a brace, as hereinafter described.

In the accompanying drawings, Figure 1 is a perspective view of my improved device. Fig. 2 is a cross-section on the line 2 2 of Fig. 1. Fig. 3 is a view illustrating the practical use of the scraper.

Referring in the first instance to Fig. 1, the numeral 1 indicates the straight bar, and 2 the longitudinally-curved bar forming the main parts of my improved scraper. These bars 1 and 2 are joined at a right angle to each other and are connected and braced by a bar 3, which serves also as a handle in practical use of the device, as shown in Fig. 3. The said bar or handle 3 extends between the end portions of the two bars 1 and 2, and thus forms practically one side of a triangle. Both bars 1 and 2 are beveled on either side edge 5 to adapt them to better serve as scrapers. The end $1^a$ of the bar 1 is straight or arranged at right angles to the side edges and is also beveled to form a cutting edge. The end $2^a$ of the curved bar 2 is curved or rounded instead of being straight and is also beveled to form a cutting edge.

In practical use of the device the flat or straight side 1 is set upon a flat or plane surface, as shown in Fig. 3, and the implement is moved from side to side or endwise, as the case may be, for removing any substance that may adhere to the bottom of the pan. The beveled end $1^a$ serves for cutting or scraping away any adhering substance in angles or corners where no curve is presented. On the other hand, the curved bar 2 is similarly used in case the bottom of the pan or kettle presents a curve surface, and the rounded end $2^a$ is employed for scraping and cleaning where the longer curve of the body cannot be conveniently employed. My improved implement is thus adapted for scraping flat and curved surfaces and is adapted for scraping and cleaning in corners or angles or curves, as the case may be. As illustrated in Fig. 3, the connecting-bar or handle 3 may be conveniently grasped between the thumb and finger of the operator's hand, while one of the bars 1 or 2 passes up between said thumb and finger and is held pressed between them. When thus held, the implement may be pushed laterally in either direction to cause the beveled side edges to scrape and clean the surface requiring it, or the implement may be shoved endwise to cause either end to work in angles or corners or on curved surfaces which would not be accessible to the body of either bar. A rib $3^a$ extends along the inner sides of the bars 1 and 2 and joins the ends of the handle or connecting-bar 3. In some cases this rib may be held between the thumb and finger when the implement is being pushed laterally.

The device is adapted for use not merely on pans, kettles, pots, &c., but also sinks, on bread-boards, and, in fact, on any surfaces, whether flat or curved, which require to be scraped and cleaned.

As shown, the scraper is formed integral and preferably of cast metal, so that it may be produced very cheaply. The faces of the two bars 1 and 2 and their cutting edges may be case-hardened, if required.

What I claim is—

1. The improved skeleton scraper composed of two narrow bars whose flat working faces meet at an angle, and whose sides are parallal to the same plane, and a handle connecting the side bars on the inner side of the angle, as shown and described.

2. The improved scraper for the purpose specified, comprising two bars arranged at an angle to each other and having cutting edges, and a handle arranged to form one side of a triangle of which the said bars form the other two sides, substantially as shown and described.

3. The improved scraper consisting of a straight or flat bar and a longitudinally-curved bar having a convex working side, the said bars being arranged at an angle to each other and both having beveled side edges, substantially as shown and described.

4. The improved scraper comprising a straight or flat bar, a longitudinally-curved bar whose working face is convex, the two being connected at an angle to each other, and a handle-bar which connects their free ends and is thus adapted for use in the manner shown and described.

5. The improved scraper for the purpose specified, consisting of a flat or straight bar having beveled sides, and a beveled end portion which is also straight or at a right angle to the side, and a longitudinally-curved bar having beveled edges and whose working face is convex, the same having a rounded and beveled free end, and a connecting brace and handle, all formed integrally, substantially as shown and described.

6. The improved scraper, comprising scraping-bars arranged at an angle to each other and provided with beveled edges, a connecting handle or bar extending between their free end portions, and a rib extending along the inner sides of the scraping-bars, as shown and described.

JAMES WILLIAM CRAWFORD.

Witnesses:
KENNETH BREWER,
AUG. RUHLANDER.